(12) United States Patent
Bresous (10) Patent No.: US 9,564,250 B2
(45) Date of Patent: Feb. 7, 2017

(54) DEVICE FOR TURNING A CONTAINER, PARTICULARLY FOR NUCLEAR FUEL ASSEMBLY, TURNING ASSEMBLY, AND NUCLEAR POWER PLANT

(75) Inventor: Luc Bresous, Bussieres (FR)

(73) Assignee: AREVA NP, Courbevoie (FR)

( * ) Notice: Subject to any disclaimer, the term of this patent is extended or adjusted under 35 U.S.C. 154(b) by 233 days.

(21) Appl. No.: 13/822,543

(22) PCT Filed: Feb. 17, 2012

(86) PCT No.: PCT/EP2012/052796
§ 371 (c)(1),
(2), (4) Date: Apr. 8, 2013

(87) PCT Pub. No.: WO2012/110645
PCT Pub. Date: Aug. 23, 2012

(65) Prior Publication Data
US 2013/0315364 A1 Nov. 28, 2013

(30) Foreign Application Priority Data
Feb. 18, 2011 (FR) ...................................... 11 51369

(51) Int. Cl.
G21F 5/14 (2006.01)
G21C 19/10 (2006.01)
(Continued)

(52) U.S. Cl.
CPC ............... *G21C 19/10* (2013.01); *G21C 19/11* (2013.01); *G21C 19/19* (2013.01); *G21C 19/32* (2013.01);
(Continued)

(58) Field of Classification Search
USPC .................................................. 376/270, 269
See application file for complete search history.

(56) References Cited

U.S. PATENT DOCUMENTS 3,894,327 A  7/1975  Jabsen
4,649,016 A * 3/1987 Hardin, Jr. .................... 376/261
(Continued)

FOREIGN PATENT DOCUMENTS

CA       1220573 A     4/1987
EP    0 529 431 A1    3/1993
(Continued)

OTHER PUBLICATIONS

International Search Report for corresponding International Application PCT/EP2012/052796.

*Primary Examiner* — Sean P Burke
(74) *Attorney, Agent, or Firm* — Davidson, Davidson & Kappel, LLC (57) ABSTRACT

A device for turning a container about a turning axis is provided. The device includes a stationary holding member and two bearing members which are spaced apart along the turning axis on each side of a space for receiving a container, and which are capable of being used for bearing on the container while enabling the rotation of the container about the turning axis relative to the bearing members. The device includes a movable holding member that is mounted onto the stationary holding member so as to rotate about the turning axis, at least one bearing member being supported by the movable holding member while being mounted onto the movable holding member so as to rotate about the drive axis, the or each bearing member supported by the movable holding member not rotating about the turning axis relative to the stationary holding member when the movable holding member rotates about the turning axis relative to the stationary holding member.

17 Claims, 8 Drawing Sheets

(51) Int. Cl.
| | |
|---|---|
| *G21C 19/11* | (2006.01) |
| *G21C 19/19* | (2006.01) |
| *G21C 19/32* | (2006.01) |
| G21C 3/334 | (2006.01) |
| G21C 3/335 | (2006.01) |

(52) U.S. Cl.
CPC .............. *G21F 5/14* (2013.01); *G21C 3/334* (2013.01); *G21C 3/335* (2013.01)

(56) References Cited

U.S. PATENT DOCUMENTS

| | | | |
|---|---|---|---|
| 5,043,132 A | | 8/1991 | Schramm |
| 5,301,214 A | * | 4/1994 | Kato et al. .................... 376/261 |
| 9,224,510 B2 | | 12/2015 | Wegeler et al. |
| 2006/0283611 A1 | | 12/2006 | Wittkowski |

FOREIGN PATENT DOCUMENTS

| | | |
|---|---|---|
| FR | 2 666 680 A1 | 3/1992 |
| FR | 2936644 A1 | 4/2010 |
| JP | 60-098392 | 6/1985 |
| JP | 02-080999 | 3/1990 |
| JP | H10160895 A | 6/1998 |
| JP | H1158395 A | 3/1999 |
| JP | 2002-302262 | 10/2002 |

* cited by examiner

DEVICE FOR TURNING A CONTAINER, PARTICULARLY FOR NUCLEAR FUEL ASSEMBLY, TURNING ASSEMBLY, AND NUCLEAR POWER PLANT

The present invention relates to a device for turning a container about a turning axis, of the type comprising a stationary holding member, two bearing members which are spaced apart along the turning axis on each side of a space for receiving a container, and which are capable of being used for bearing on the container while enabling the rotation of the container about the turning axis relative to the bearing members.

BACKGROUND

A nuclear fuel assembly for Pressurised Water Reactor, "PWR", generally comprises of a bundle of nuclear fuel rods of great length arranged parallel to each other and a frame for holding the rods comprising of a bottom tie plate, a top tie plate, guide tubes being substituted for certain rods of the bundle and interconnecting between them the bottom tie plate and the top tie plate, and spacer grids attached to the guide tubes and distributed between the bottom tie plate and the top tie plate. The rods are held transversely and longitudinally by the spacer grids.

The nuclear fuel assembly has an elongated shape and its length is of the order of several meters, typically about four meters long, with a mass of several hundred kilogrammes, typically of the order of 600 to 800 kg. As a result, operations of handling nuclear fuel assemblies are often difficult.

In light of its use, the nuclear fuel assembly is arranged vertically in a nuclear reactor core, with the bottom tie plate being disposed at the bottom and top tie plate at the top.

During operation, it is possible that one of the fuel rods of the nuclear fuel assembly or the holding frame may be damaged and must be replaced. In addition, the fuel rods are regularly extracted for the purposes of carrying out laboratory examination or for reintegration into the bundle of rods of another fuel assembly for experimental purposes.

Nuclear fuel assemblies are generally designed so as to be able to extract each rod from the frame after the dismantling of one of the tie plates. In general, the extraction of the rod is carried out from the top after the dismantling of the top tie plate. In some cases, for example in the event of breakage of a fuel rod and when the two pieces have to be extracted or when all of the fuel rods must be transferred from a damaged frame to a new frame, it may be necessary to carry out the extraction from the bottom of the assembly after dismantling of the bottom tie plate. In this case, it is necessary to first turn over the nuclear fuel assembly. All these operations are carried out under water in order to avoid exposure to radiation.

FR 2 666 680 discloses a turning assembly comprising of a nuclear fuel assembly container, also called "cell", and a device for turning the container. The container comprises two coaxial trunnions provided on two opposite faces of the container. The turning device comprises of a lifting beam capable of being suspended from a crane, the lifting beam consisting of two columns that are spaced apart in a manner so as to receive between them the container, and two bearing members positioned at the lower ends of the columns and capable of being used for bearing on the trunnions of the container while enabling the rotation of the container about a horizontal turning axis, the turning device further comprising of a drive arm mounted on the lifting beam so as to be rotatable around the turning axis in order to drive the container, supported on the supporting members, in rotation about the turning axis.

However, this turning assembly requires the use of a crane for suspending the lifting beam. The crane is thus monopolised and is no longer available to perform other operations, for example the operations of loading/unloading of nuclear fuel assemblies in the reactor core.

Moreover the turning operations using the lifting beam suspended from the crane are carried out in a maintenance pool over the cells for temporary storage of nuclear fuel assemblies. These cells must therefore be emptied for safety reasons, this necessitates the moving of nuclear fuel assemblies to be undertaken, which is very time intensive, before being able to turn over the nuclear fuel assembly on which repairs and/or replacement of fuel rods and/or of the support frame must be carried out.

SUMMARY OF THE INVENTION

An object of the invention is to provide a turning device that can be easily integrated into a nuclear power plant, which is compact and easy to use.

To this end, a turning device of the aforementioned type is provided, characterised in that it comprises of a movable holding member that is mounted on to the stationary holding member so as to be rotatable around the turning axis, at least one bearing member being supported by the movable holding member while being mounted onto the movable holding member so as to rotate about the drive axis, the or each bearing member supported by the movable holding member not rotating about the turning axis relative to the stationary holding member when the movable holding member rotates about the turning axis relative to the stationary holding member.

According to other embodiments, the turning device comprises one or more of the following characteristic features, taken in isolation or in accordance with any technically possible combinations:

- the turning device comprises of a clamping mechanism capable of holding the or each bearing member mounted on said movable holding member so as to prevent it rotating around the turning axis when the movable holding member is rotating about the turning axis relative to the stationary holding member;
- the clamping mechanism is supported at least in part by the movable holding member;
- the clamping mechanism includes a synchronising shaft mounted on the movable holding member so as to rotate about a synchronisation axis parallel to the turning axis, the synchronising shaft being driven to revolve circularly about the turning axis on account of the rotation of the movable holding member and driven in rotation about its axis by a mechanical linkage with each bearing member;
- each mechanical linkage consists of a synchronising gear comprising a planet wheel with axis being the turning axis, being in fixed rotational connection with the bearing member and a satellite wheel, the satellite wheels of the two synchronising gears being rotationally connected by the synchronising shaft;
- the satellite wheel of each synchronising gear is mounted on the synchronising shaft and in fixed rotational connection with the synchronising shaft;
- the movable holding member is rotatable through 360° about the turning axis relative to the stationary holding member;

the movable holding member supports one bearing member in cantilevered overhang position in relation to the other bearing member, the other bearing member being located between the bearing member carried in cantilevered overhang position by the movable holding member and the stationary holding member;

the movable holding member comprises a proximal portion and a distal portion spaced apart along the turning axis and located on each side of the receiving space, the proximal portion is mounted on the stationary holding member so as to be rotatable about the drive axis, and the distal portion is in cantilevered overhang position and supports the bearing member;

a bearing member is attached to the stationary holding member;

the stationary holding member comprises a stationary support shaft extending along the turning axis, a bearing member being attached to one end of the stationary support shaft;

the movable holding member is mounted so as to rotate on the support shaft;

the turning device comprises at least one rotating drive arm of a container received so as to be supported on the bearing member, integrally attached to the movable holding member;

the turning device is capable of turning a nuclear fuel assembly container; and the turning device is capable of being operated under water.

A turning assembly is provided comprising of a nuclear fuel assembly container and a device for turning the container as defined above and a nuclear power generation plant is provided comprising a turning assembly as defined above.

BRIEF SUMMARY OF THE DRAWINGS

The invention and its advantages shall be better understood upon reading the description that follows, provided by way of example and without limitation, and with reference being made to the accompanying drawings, in which.

DETAILED DESCRIPTION

Figure 1:
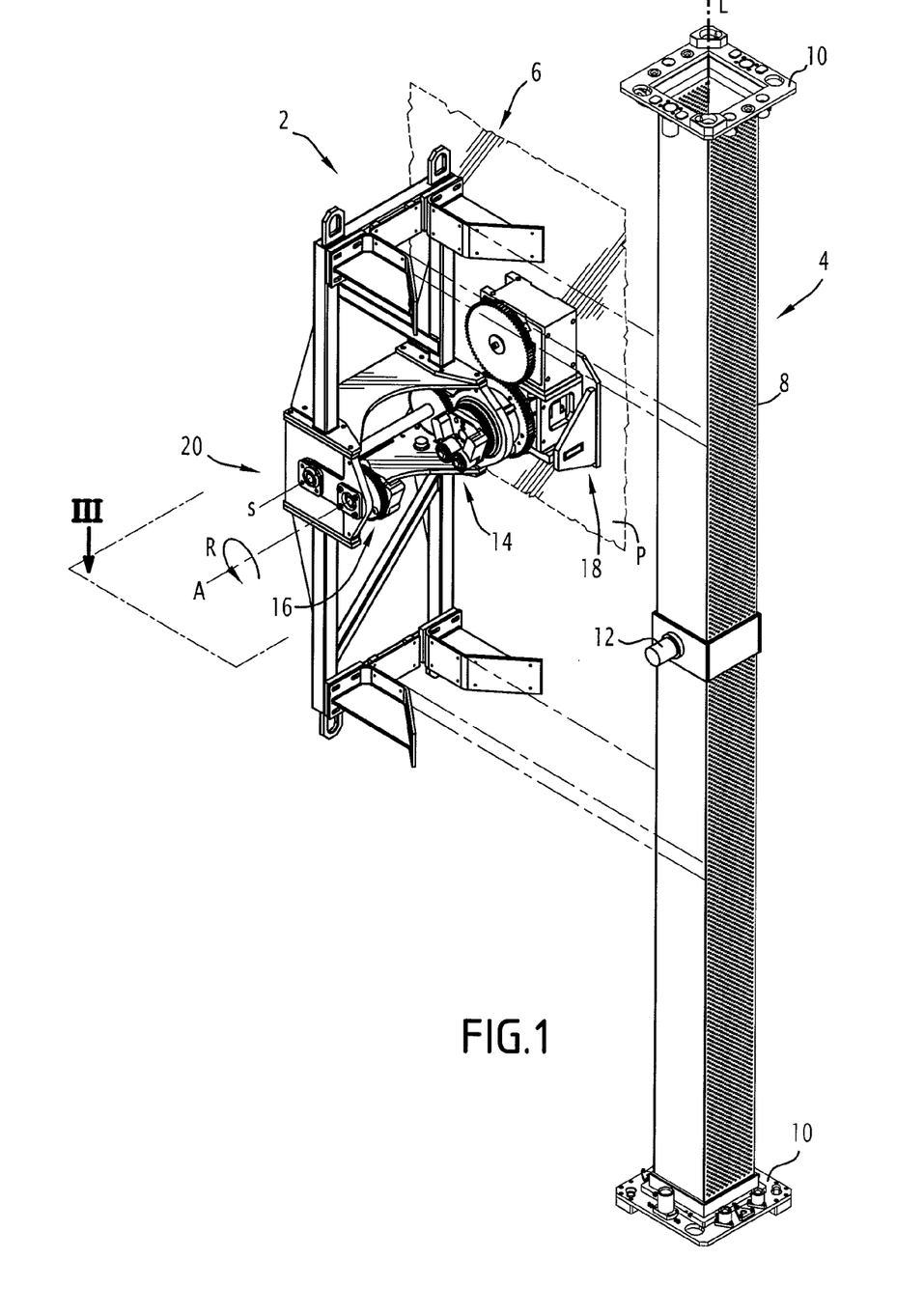
FIGS. 1 and 2 are perspective views of a turning assembly in accordance with the invention comprising of a container and a device for turning of the container, respectively before and after insertion of the container in the turning device.
Figure 2:
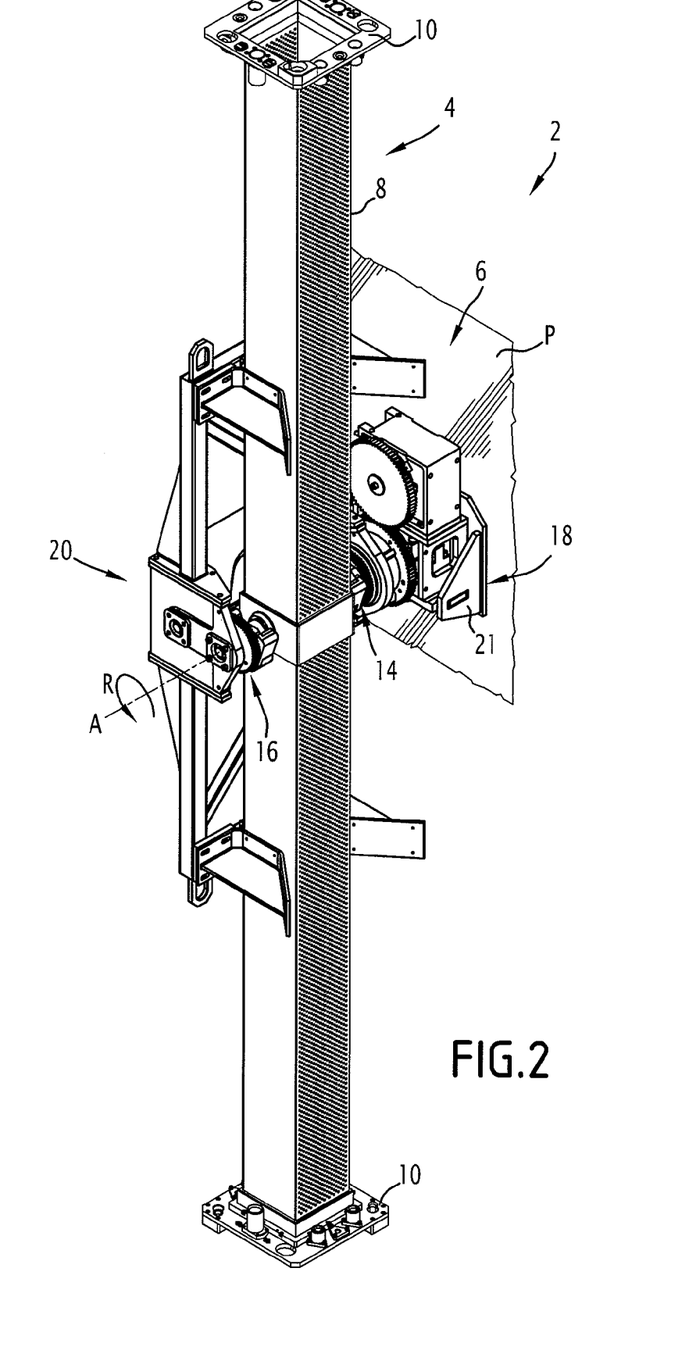

The turning assembly 2 illustrated in FIGS. 1 and 2 comprises of a container 4 suitable for receiving a nuclear fuel assembly (not shown) and a turning device 6 making it possible to turn the container 4 about a horizontal turning axis A.

A nuclear fuel assembly typically comprises of a bundle of nuclear fuel rods of great length arranged parallel to each other and a frame for holding the rods comprising of a bottom tie plate, a top tie plate, guide tubes being substituted for certain rods of the bundle and interconnecting between them the bottom tie plate and the top tie plate, and spacer grids attached to the guide tubes and distributed between the bottom tie plate and the top tie plate. The rods are held transversely and longitudinally by the spacer grids. The nuclear fuel assembly has an elongated shape and a length measuring several meters, typically about four meters, with a mass of several hundred kilogrammes, typically of the order of 600 to 800 kg.

The container 4 comprises a tubular casing 8 elongated along a longitudinal axis L. The casing 8 internally delimits a housing for receiving a nuclear fuel assembly. The casing 8 is open at its two longitudinal ends.

The container 4 comprises two base collars 10 each positioned at a respective longitudinal end of the casing 8. Each base collar 10 is designed so as to enable the holding, inside the casing 8, of the nuclear fuel assembly received within the casing 8.

The container 4 comprises two coaxial trunnions 12 (only one of these being visible in FIG. 1) disposed on each side of the casing 8 on the external surface of the casing 8.

The trunnions 12 are disposed substantially midway between the longitudinal ends of the casing 8, in a manner such that the axis of the trunnions 12 passes substantially through or close to the centre of gravity of the loaded container 4 of a nuclear fuel assembly.

The turning device 6 is capable of receiving the container 4, of supporting the container 4 by its trunnions 12 and turning the container 4 about the turning axis A (arrow R in FIGS. 1 and 2). The turning axis A coincides with the axis of the trunnions 12 when the container 4 is supported on the turning device 6 (FIG. 2). The turning device 6 is appropriately dimensioned so as to support and turn over a loaded container 4 of a nuclear fuel assembly, and is of course capable of supporting and turning over the empty container.

The turning device 6 comprises of a first bearing member 14 and a second bearing member 16 which are capable of being used for simply bearing on the trunnions 12 of the container 4 while enabling the free rotation of the container 4 about the turning axis A.

The first bearing member 14 and the second bearing member 16 are aligned along the turning axis A and spaced apart from each other along the turning axis A. The first bearing member 14 and the second bearing member 16 delineate a space between them for receiving the container 4.

The container 4 is capable of being inserted in the vertical upright position between the first bearing member 14 and the second bearing member 16 in a manner so as to be simply placed to be supported by its trunnions 12 on the first bearing member 14 and the second bearing member 16, each trunnion being be supported on the respective bearing member (FIG. 2).

Figure 3:
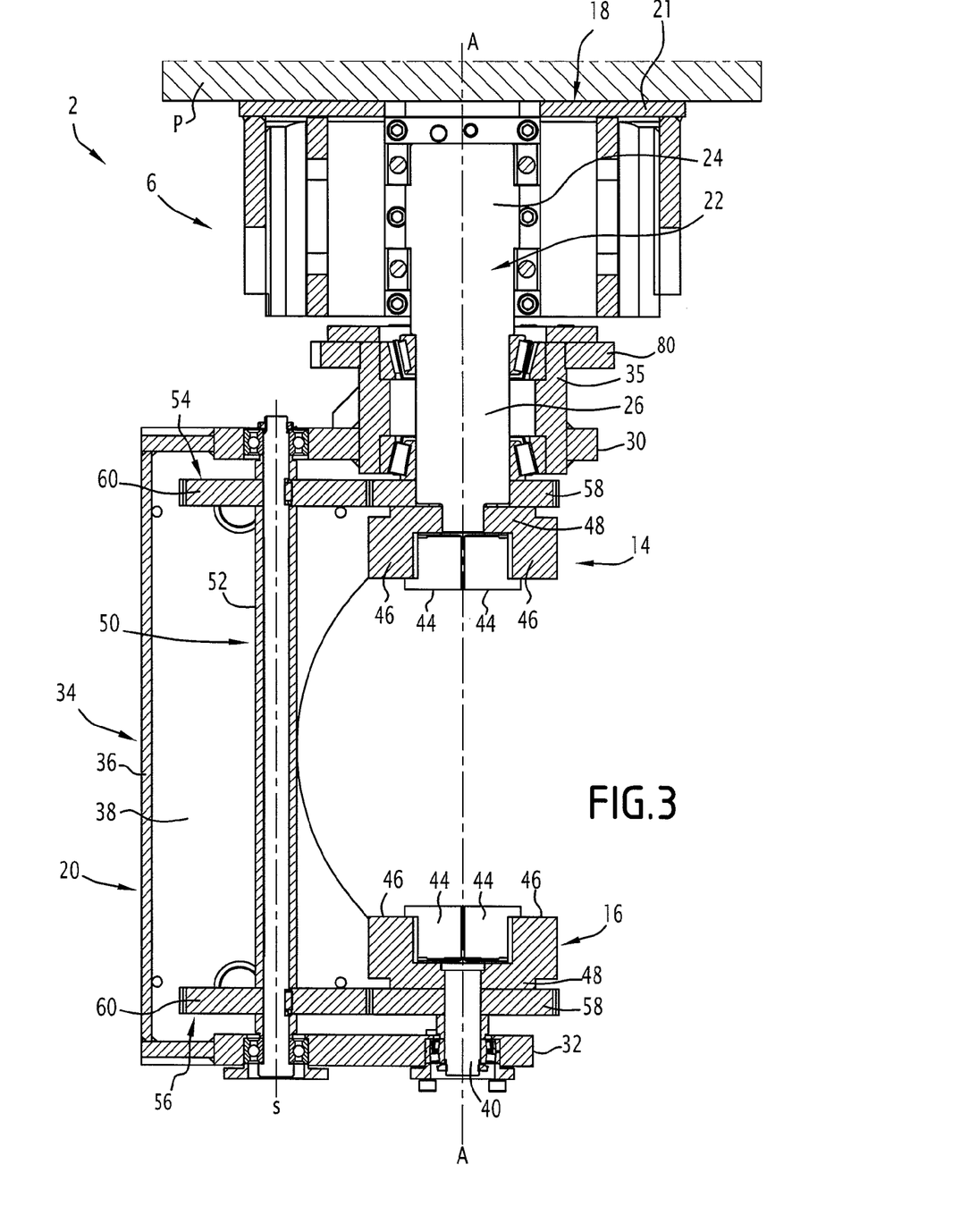
FIG. 3 is a cross sectional view along the plane III of FIG. 1 of the turning device in FIG. 1.

With reference to FIG. 3, the turning device 6 comprises a stationary holding member 18 and a movable holding member 20.

The stationary holding member 18 is fixed on a side wall P of a pool for storage and handling of the nuclear fuel assembly in a nuclear plant.

The stationary holding member 18 comprises a chassis 21 and a fixed support shaft 22. The chassis 21 is intended to be fixed to the side wall P. The support shaft 22 is attached to the chassis 21 and extends along the turning axis A. The support shaft 22 is attached in cantilevered overhang position on the chassis 21. It comprises a proximal section 24 encased in the chassis 21 and a free distal section 26 extending in cantilever overhang position from the proximal section 24.

The movable holding member 20 is supported by the stationary holding member 18. It is mounted so as to be rotatable about the turning axis A of the support shaft 22 of the stationary holding member 18. The movable holding member 20 is mounted in cantilevered overhang position on the support shaft 22 of the stationary holding member 18.

The movable holding member 20 includes a proximal portion 30 and a distal portion 32 spaced apart along the turning axis A. It comprises an intermediate portion 34 connecting the proximal portion 30 and distal portion 32 to each other. The proximal portion 30 and distal portion 32 are located on each side of the space for receiving the container 4.

The proximal portion 30 is mounted on the stationary holding member 18 to be rotatable about the turning axis A. More particularly, the proximal portion 30 is rotatably mounted on the distal section 26 of the support shaft 22. In order to do this, it comprises a tubular sleeve 35 fitted over the distal section 26 of the support shaft 22 and rotatably mounted on the latter by means of bearings.

The distal portion 32 and the intermediate portion 34 extend in cantilevered overhang position from the proximal portion 30.

The movable holding member 20 bypasses the receiving space delineated between the first bearing member 14 and the second bearing member 16. The movable holding member 20, when viewed along a direction perpendicular to the turning axis A, has a generally 'U' shaped form whose side branches are defined by the proximal portion 30 and distal portion 32, and the core is defined by the intermediate portion 34.

The intermediate portion 34 extends between the distal portion 32 and proximal portion 30 along the turning axis A while being laterally offset in relation to the turning axis A.

The intermediate portion 34 comprises a central sheet 36 and two lateral side plates 38 located on each side of the central sheet 36 giving the intermediate portion 34, when viewed along a direction parallel to the turning axis A, a U shaped cross section open towards the turning axis A.

Each lateral side plate 38 has an edge that is arc shaped so as to free the receiving space defined between the first bearing member 14 and the second bearing member 16.

The first bearing member 14 is supported by the stationary holding member 18. The first bearing member 14 is mounted in a fixed manner on the stationary holding member 18.

More particularly, the first bearing member 14 is fixed to the free end of the distal section 26 of the support shaft 22.

The second bearing member 16 is supported by the movable holding member 20, in cantilevered overhang position in relation to the stationary holding member 18. The second bearing member 16 is mounted to be rotatable about the turning axis A of the distal portion 32 of the movable holding member 20.

Specifically, the second bearing member 16 is fixed to a pivot 40 extending along the turning axis A in the direction of the proximal portion 30. The pivot 40 is rotatably mounted by means of bearings on the distal portion 32.

The first bearing member 14 and the second bearing member 16 are located axially along the turning axis A between the proximal portion 30 and the distal portion 32 of the movable holding member 20.

The first bearing member 14 and the second bearing member 16 are identical and arranged symmetrically in relation to a median vertical plane perpendicular to the turning axis A.

Figure 4:
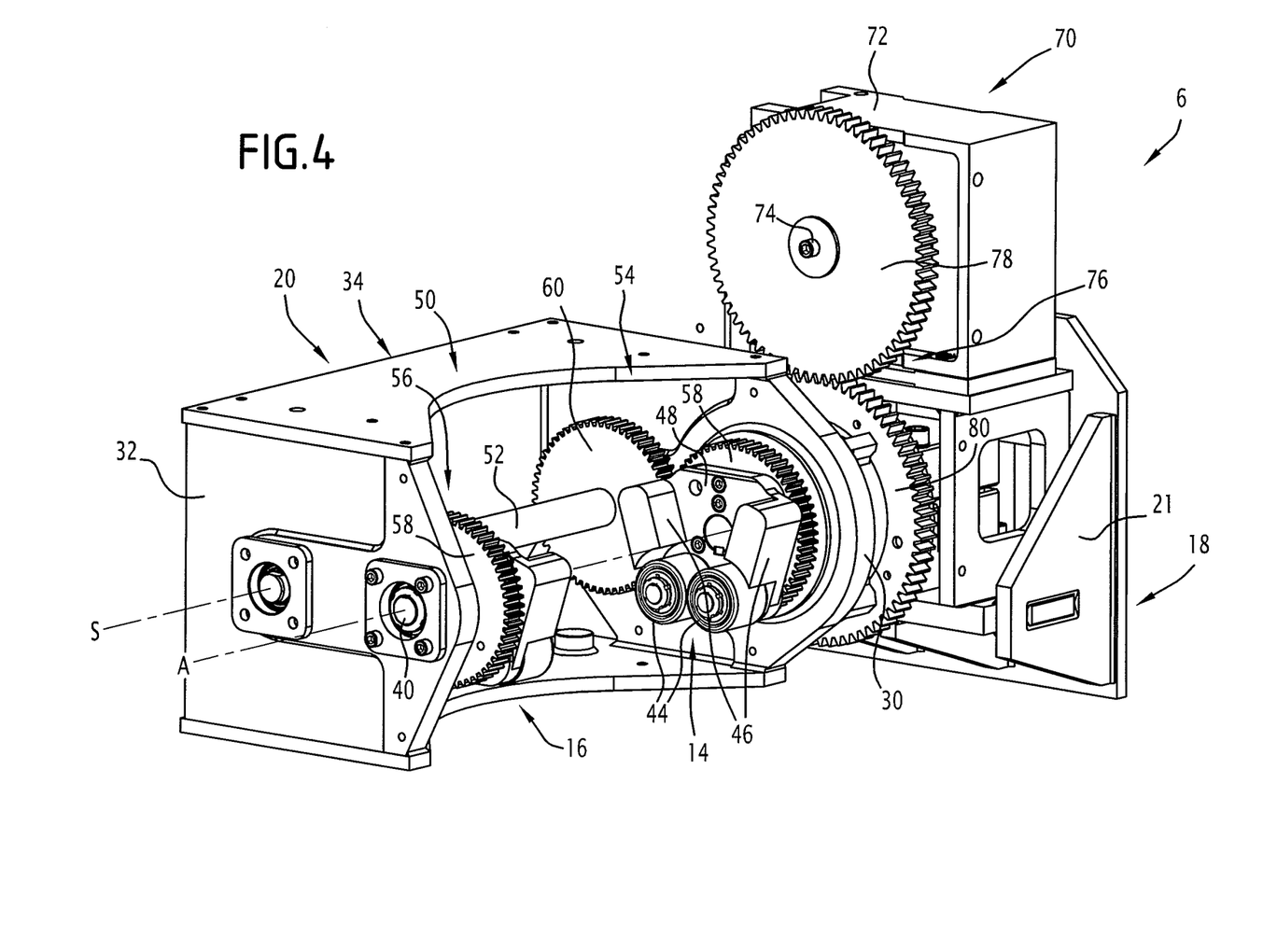
FIGS. 4 and 5 are partial perspective views of the turning device in FIG. 1 according to two different viewing directions.
Figure 5:
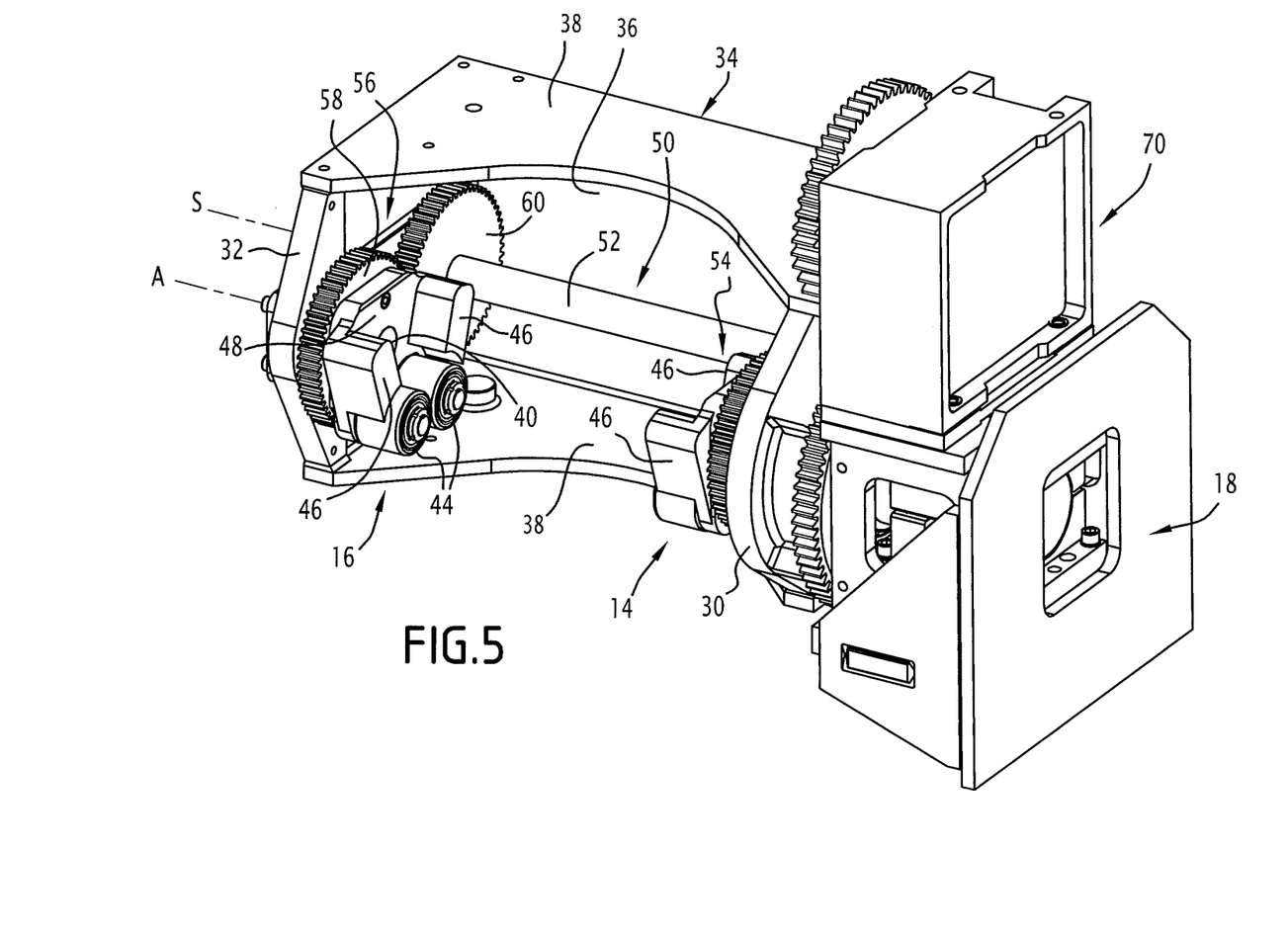

As shown in FIGS. 4 and 5, each bearing member 14, 16 comprises a pair of support rollers 44 arranged side by side so as to be able to place a trunnion 12 to be supported on the two support rollers 44 simultaneously.

The two support rollers 44 of each bearing member 14, 16 are disposed on each side of a vertical median plane passing through the turning axis A. Each support roller 44 is freely rotatable about its own axis parallel to the turning axis A.

The distance between the very own axis of each support roller 44 and the turning axis A is substantially equal to the sum of the outer radius of each support roller 44 and the outer radius of a trunnion 12. As a result thereof the very own axis of a trunnion 12 being supported on a pair of support rollers 44 of a bearing member 14, 16 coincides with the turning axis A.

A trunnion 12 supported on the support rollers 44 of a bearing member 14, 16 is freely rotatable about the turning axis A. As a result thereof the container 4 being supported through its trunnions 12 on the supporting members 14, 16 and is simply supported and freely rotatable on the bearing members 14, 16.

Each bearing member 14, 16 comprises a pair of guide ramps 46 flaring outwards towards the top and converging towards the bottom in the direction of the supporting rollers 44 for guiding the trunnions 12 of a container 4 towards the support rollers 44 during the placing of the container 4 so as to be supported on the supporting rollers 44.

Each bearing member 14, 16 comprises a mounting base 48 carrying the support rollers 44 and the guide rails 46. The mounting base 48 of the first bearing member 14 is attached to the free end of the distal section 26 of the support shaft 22. The mounting base 48 of the second bearing member 16 is attached to the pivot 40.

Returning to FIG. 3, the turning device 6 comprises a clamping mechanism 50 capable of holding the second bearing member 16, supported by the movable holding member 20, not rotating about the turning axis A, during the rotation of the movable holding member 20 about the turning axis A.

The clamping mechanism 50 is supported at least in part by the movable holding member 20. While rotating it links the second bearing member 16 to the first bearing member 14 and/or to the stationary holding member 18, in a manner such that the second bearing member 16 remains motionless and prevented from rotating when the movable holding member 20 is in rotation.

The clamping mechanism 50 comprises a synchronising shaft 52 extending along a synchronisation axis S parallel to the turning axis A. The synchronising shaft 52 is offset relative to the turning axis A. The synchronising shaft 52 is supported by the movable holding member 20 and is mounted on to the movable holding member 20 so as to be rotatable about the synchronisation axis S. The synchronising shaft 52 extends between the proximal portion 30 and distal portion 32 of the movable holding member 20. The ends of the synchronising shaft 52 are mounted so as to be rotatable, one on the proximal portion 30 and the other on the distal portion 32.

The synchronising shaft 52 is rotationally driven by means of a first mechanical linkage with the first bearing member 14 and by means of a second mechanical linkage with the second bearing member 16. The first mechanical linkage is a first synchronising gear 54 and the second mechanical linkage is a second synchronising gear 56.

Each one of the first synchronising gear 54 and the second synchronising gear 56 comprises a planet wheel 58 with axis being the turning axis A, and a satellite wheel 60 with axis being the synchronisation axis S, which are mutually engaged.

The first synchronising gear 54 and the second synchronising gear 56 have the same gear reduction ratio. In the illustrated example, the synchronising gears 54 and 56 have a gear reduction ratio of 1, the planet wheel 58 and the satellite wheel 60 of each synchronising gear 54, 56 having the same nominal diameter. As a variant, the synchronising gears 54 and 56 have a gear reduction ratio that is less than 1 or greater than 1, the planet wheel 58 and the satellite wheel 60 of each synchronising gear 54, 56 being of different nominal diameters.

The planet wheels 58 of the synchronising gears 54, 56 preferably have identical teeth and their satellite wheels 60 of the synchronising gears 54, 56 preferably have identical teeth.

The planet wheel 58 of the first synchronising gear 54 is mounted on the support shaft 22, axially between the first bearing member 14 and the proximal portion 30 of the movable holding member 20 and is in fixed rotational connection with the support shaft 22 and the first bearing member 14.

The planet wheel 58 of the second synchronising gear 56 is mounted on the pivot 40, axially between the second bearing member 16 and the distal portion 32 of the movable holding member 20, and is in fixed rotational connection with the pivot 40 and the second bearing member 16. The satellite wheels 60 of the first synchronising gear 54 and the second synchronising gear 56 are rotationally connected by the synchronising shaft 52. Each satellite wheel 60 is mounted on to a respective end of the synchronising shaft 52 and is in fixed rotational connection with the synchronising shaft 52.

Figure 6:
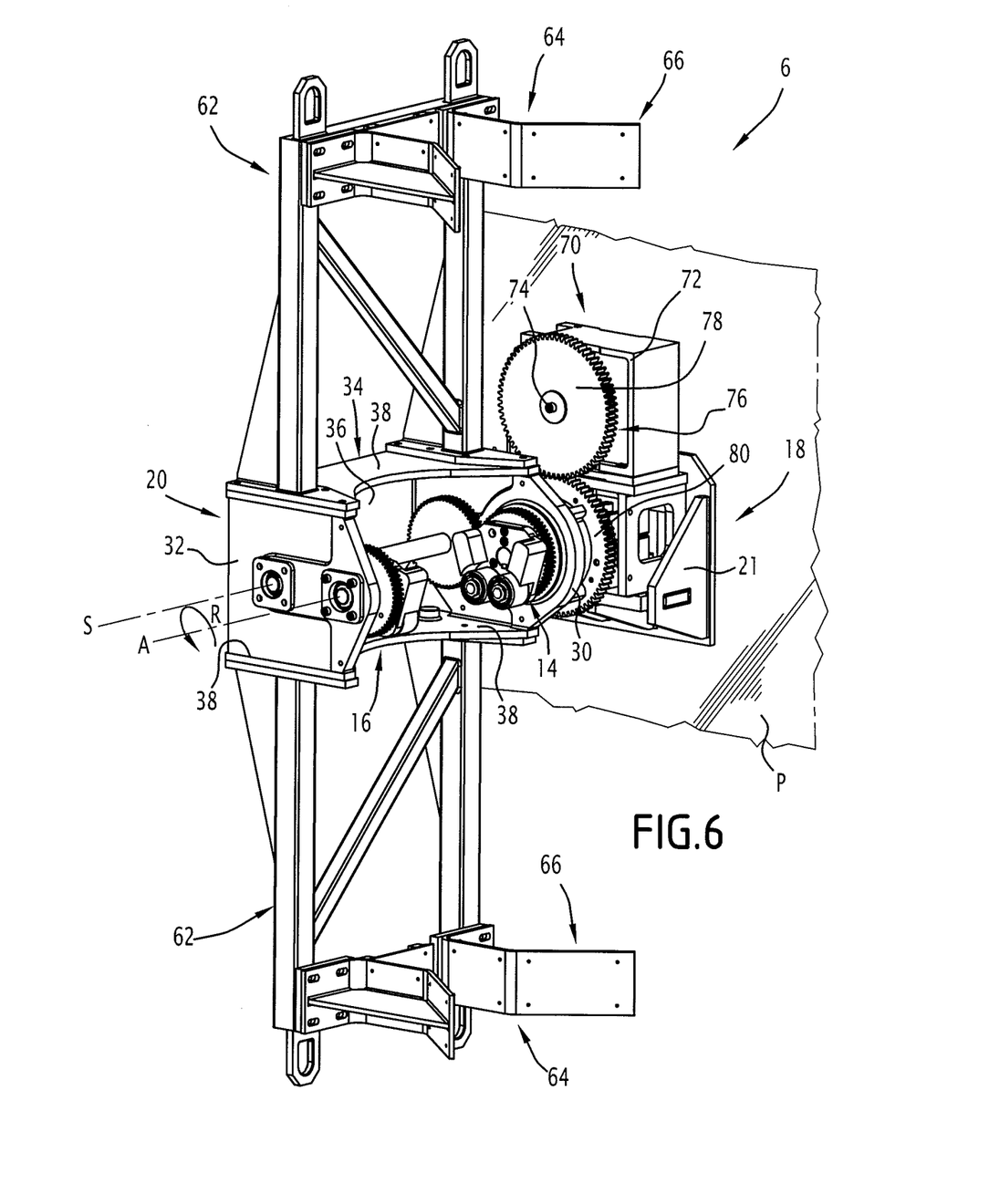
FIGS. 6 to 8 are perspective views of the turning device in FIG. 1 alone, presented in three successive positions during the turning of a container.

As illustrated in FIG. 6, the turning device 6 comprises two drive arms 62 fixed on the movable holding member 20 and extending from each side of the movable holding member 20 in a manner so as to be bearing on the end portions of a container 4 received by the turning device 6.

Each drive arm 62 includes an end 64 comprising a V shaped guide 66 converging in a direction of insertion of the container for guiding the end portions of the container 4 when being placed so as to be supported on the bearing members 14, 16.

The turning device 6 comprises a drive device 70 for rotationally driving the movable holding member 20 relative to the stationary holding member 18.

The drive device 70 includes a motor 72 whose output shaft 74 is rotationally connected to the proximal portion 30 of the movable holding member 20 by way of a drive gear 76 having a driving wheel 78 integral with the output shaft 74 and a driven wheel 80 mounted on the support shaft 22 and in fixed rotational connection with the proximal portion 30. The motor 72 is attached to the chassis 21. The driven wheel 80 is disposed axially along the support shaft 22 between the proximal portion 30 and the chassis 21.

Figure 7:
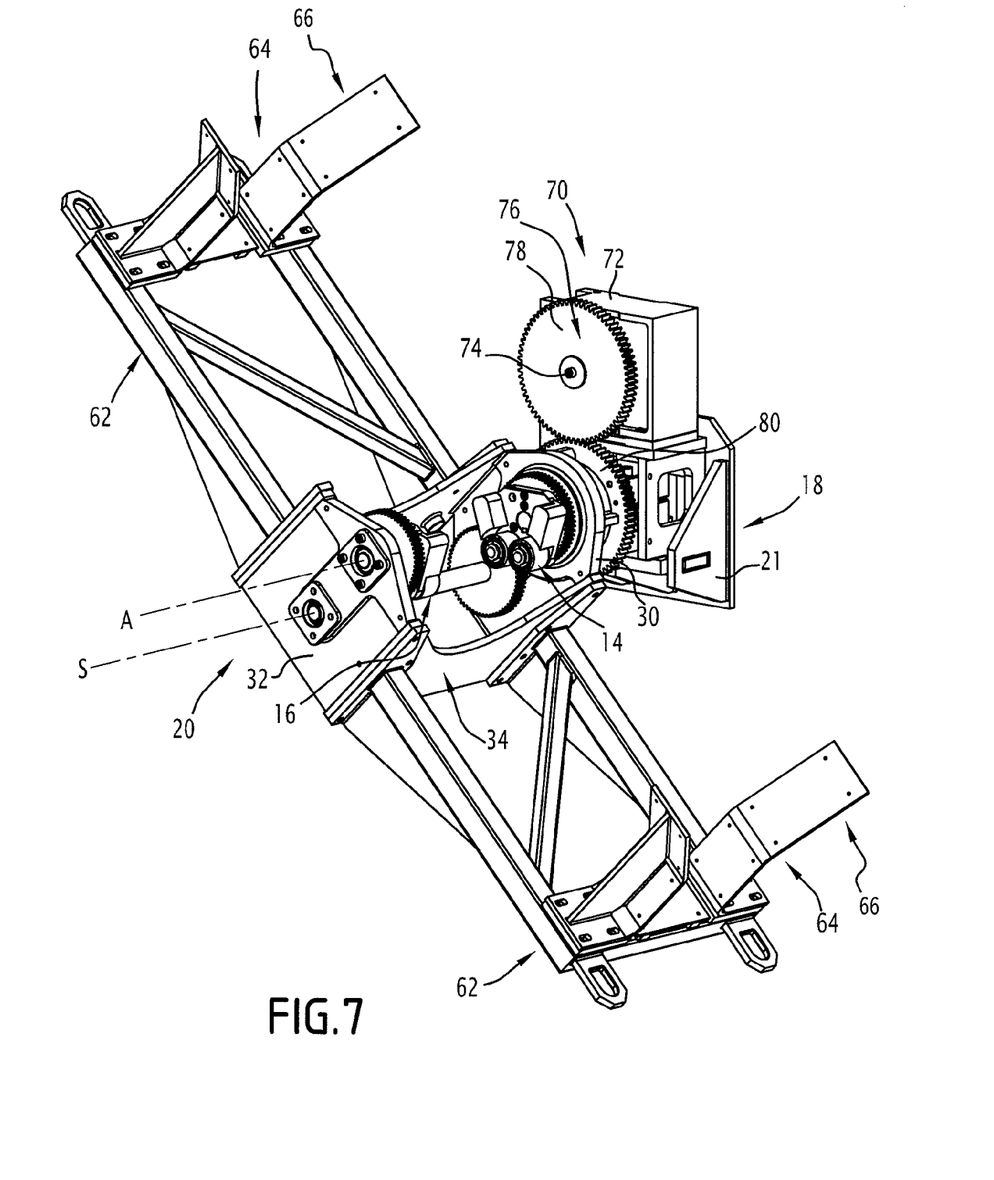
Figure 8:
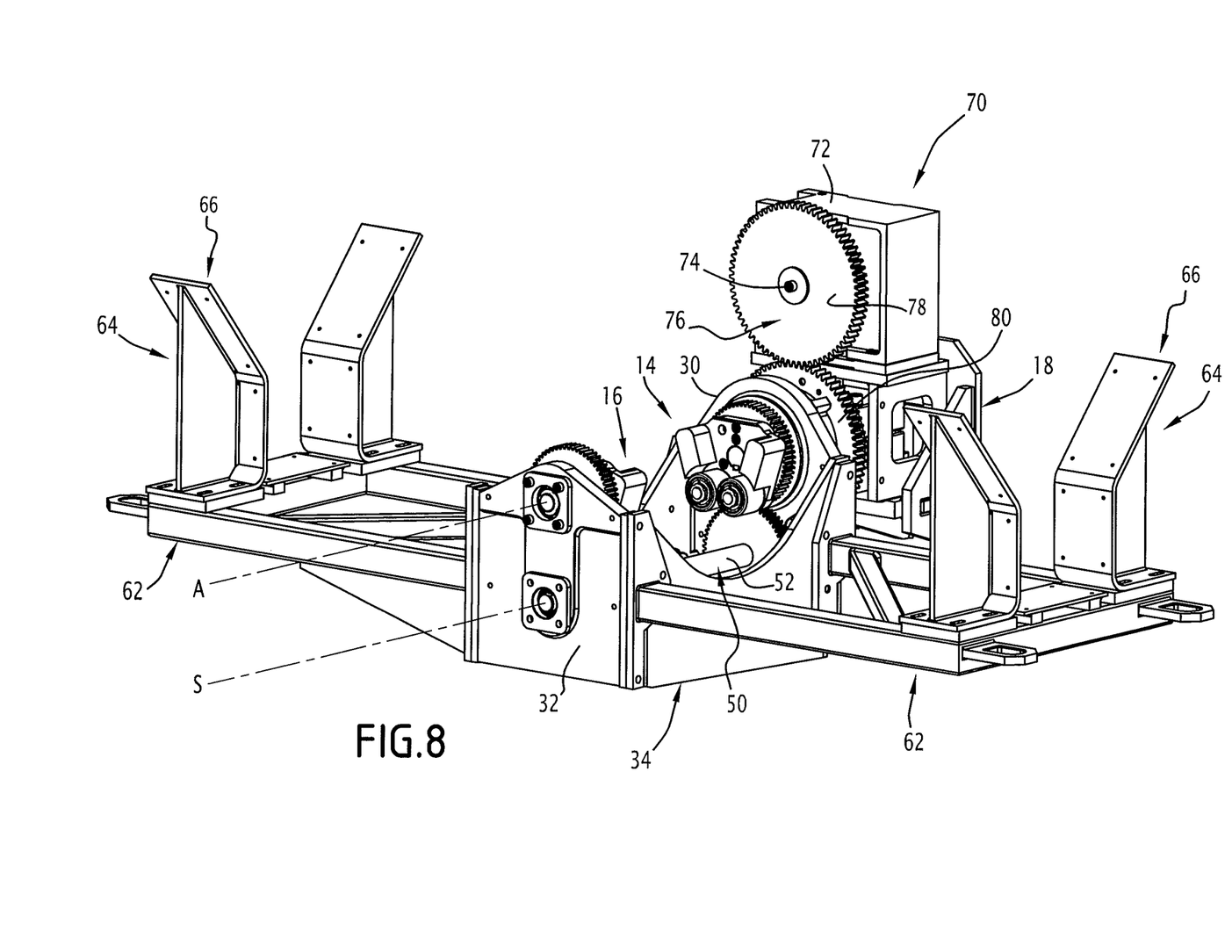

In operation, with reference to FIGS. 6 to 8, the motor 72 drives the movable holding member 20 to rotate about the turning axis A relative to the stationary holding member 18.

The clamping mechanism 50 synchronises the rotation of the first bearing member 14 and the second bearing member 16 by means of the movable holding member 20. In other words, regardless of the position of the movable holding member 20, the first bearing member 14 and the second bearing member 16 retain the same orientation relative to the movable holding member 20. Furthermore, the first bearing member 14 is held so as to prevent its rotating about the turning axis A relative to the stationary holding member 18. The first bearing member 14 and the second bearing member 16 thus remain motionless and prevented from rotating relative to the stationary holding member 18.

As a result thereof the second bearing member 16 is supported by the movable holding member 20 but remains motionless and prevented from rotating about the turning axis A relative to the stationary holding member 18, when the movable holding member 20 is in rotation relative to the stationary holding member 18.

The clamping mechanism 50 defines a planetary gear train connecting the first bearing member 14 to the second bearing member 16. The synchronising shaft 52 and two satellite wheels 60 define the satellite. The movable holding member 20 defines the satellite holder. The planet wheels 58 are coaxial and each is integrally attached to a respective bearing member 14, 16. The movable holding member 20 holds the second bearing member 16.

The planet wheel 58 integrally attached to the first bearing member 14 is fixed. The satellite holder (movable holding member 20) is rotatable and the gear reduction ratios between the satellite (synchronising shaft 52 and planet wheels 60) and the two planet wheels 58 are identical. As a result thereof, the planet wheel 58 integrally attached to the second bearing member 16 is stationary and not rotating about the turning axis when the satellite holder (movable holding member 20) is in rotation.

During rotation of the movable holding member 20, the synchronising shaft 52 performs a circular revolution around the turning axis A. Each satellite wheel 60 follows the circular revolution around the associated planet wheel 58, while rotating about the synchronisation axis S on account of the engagement of each planet wheel 60 with the corresponding planet wheel 58.

During rotation of the movable holding member 20, based on the direction of rotation, one drive arm 62 or the other is supported on the container 4 and drives it in rotation around the turning axis A.

FIGS. 6 to 8 illustrate the movement of the movable holding member 20 by 90°. In order to enable the turning, the movable holding member 20 rotates to at least 180° about the turning axis A. Preferably, the turning device 6 enables the turning of the movable holding member 20 by more or less 360° around the turning axis A. The movable holding member may possibly perform several rotations.

According to the invention, the second bearing member 16 is held by the movable holding member 20 in cantilevered overhang position in relation to the first bearing member 14 and the stationary holding member 18, the movable holding member 20 being able to pivot about the turning axis A in order to drive the container 4 and follow it while it is being turned, the second bearing member 16 remaining motionless and prevented from rotating relative to the stationary holding member 18.

The turning device 6 is compact despite the length of the container 4 (on the order of 4 to 6 m). The stationary holding member 18 is arranged on the side of the container 4 received in the turning device 6 outside the trajectory of the container 4, and the movable holding member 20 follows the movement of the container 4. The stationary holding member 18 and the movable holding member 20 may be designed with reduced dimensions.

The turning device 6 is fixed on a side wall of a pool, the movable holding member 20 thus extending in cantilevered overhang position from the side wall.

The turning device 6 does not monopolise a crane. The crane with which the nuclear facilities are equipped thus remains available for other operations that it may be possible to perform simultaneously with the turning operations of the turning device 6. The turning device 6 fixed to a side wall does not require a support structure on the bottom of the pool resulting in a high surface area requirement.

The turning device 6 makes it possible to perform the turning operations on the side of the pool away from the cells for temporary storage of nuclear fuel assemblies. It is therefore not necessary to empty these cells.

The turning device 6 is easy to use. The container 4 is placed simply supported on the supporting members 14, 16. The rotation of the movable holding member 20 drives the rotation of the container 4.

The turning device 6 is simple and reliable. Preventing the rotation of the second bearing member 16 supported by the movable holding member 20 is achieved by using a simple clamping mechanism 50 comprising gears and a synchronising shaft 52.

The invention is not limited to the disclosed embodiment, other embodiments are possible. For example, it is possible to replace the synchronising gears with belt transmissions or chain transmissions.

Thus, the immobilisation is generally obtained by an epicyclic motion based mechanism comprising a satellite component mounted on the movable holding member so as to be rotatable about a synchronisation axis S, driven to revolve around the turning axis A due to the rotation of the movable holding member and driven to rotate about the synchronisation axis S by the mechanical linkage (gear, belt, chain) with a planetary component member with axis being the turning axis A integrally attached to each bearing member, at least one bearing member and the associated planetary component being rotatably mounted on the movable holding member, in a manner such that the or each bearing member supported by the movable holding member remains motionless during rotation of the movable holding member.

The invention is applicable to the turning of the nuclear fuel assemblies of the type for light water reactors (LWR), and in general for all types of nuclear fuel assemblies. In this case, the structure is made out of nuclear grade material such as stainless steel of the AISI grades 304 or 316, and preferably low-carbon grades.

The invention is also applicable to other business sectors in the widely varied industrial world, for the purpose of turning over a container designed to receive any type of content.

Thus, in a general manner, the invention relates to a device for turning a container, comprising a stationary holding member, two bearing members which are spaced apart along the turning axis on each side of a space for receiving a container, and which are capable of being used for bearing on the container, for example with two coaxial trunnions of the container, while enabling the rotation of the container relative to the bearing members, about the turning axis of the turning device. The turning device comprises of a movable holding member that is mounted on to the stationary holding member so as to be rotatable around the turning axis, at least one bearing member being supported by the movable holding member while being mounted onto the movable holding member so as to rotate about the drive axis, the or each bearing member supported by the movable holding member not rotating about the turning axis relative to the stationary holding member when the movable holding member rotates about the turning axis relative to the stationary holding member.

What is claimed is:

1. A turning device for turning a container about a turning axis comprising:

a stationary holding member;

a movable holding member mounted on the stationary holding member while being rotatable about the turning axis with respect to the stationary holding member;

two bearing members which are spaced apart along the turning axis and which are configured for receiving the container therebetween with the container bearing on the two bearing members and being allowed to rotate about the turning axis with respect to the bearing members, at least one of the bearing members being supported by the movable holding member such that the at least one bearing member is rotatable about the turning axis with respect to the movable holding member, the turning device being configured such that the at least one bearing member supported by the movable holding member does not rotate about the turning axis relative to the stationary holding member when the movable holding member rotates about the turning axis relative to the stationary holding member.

2. The turning device according to claim 1 further comprising a clamp capable of holding the at least one bearing member mounted on the movable holding member so as to prevent the at least one bearing member from rotating around the turning axis when the movable holding member is rotating about the turning axis relative to the stationary holding member.

3. The turning device according to claim 2, wherein the clamp is supported at least in part by the movable holding member.

4. The turning device according to claim 2, wherein the clamp comprises a synchronizing shaft mounted on the movable holding member so as to be rotatable about the synchronization axis parallel to the turning axis, the synchronizing shaft being driven to revolve circularly about the turning axis on account of the rotation of the movable holding member and driven to rotate about an axis of the synchronizing shaft by a mechanical linkage with each bearing member.

5. The turning device according to claim 4, wherein each mechanical linkage comprises includes one synchronizing gear comprising a planet wheel with an axis being the turning axis and in fixed rotational connection with the bearing member and a satellite wheel, the satellite wheels of the two synchronizing gears being connected in rotation by the synchronizing shaft.

6. The turning device according to claim 5, wherein the satellite wheel of each synchronizing gear is mounted on the synchronizing shaft and is in fixed rotational connection with the synchronizing shaft.

7. The turning device according to claim 1, wherein the movable holding member is rotatable through 360° about the turning axis relative to the stationary holding member.

8. The turning device according to claim 1, wherein the movable holding member supports one bearing member in cantilevered overhang position relative to the other bearing member, the other bearing member being located between the bearing member supported in cantilevered overhang position by the movable holding member and the stationary holding member.

9. The turning device according to claim 8, wherein the movable holding member comprises a proximal portion and a distal portion spaced apart along the turning axis and located on each side of the receiving space, the proximal portion is mounted on the stationary holding member so as to be rotatable about the drive axis, and the distal portion is in cantilevered overhang position and supports the bearing member.

10. The turning device according to claim 1, wherein one of the bearing members is attached to the stationary holding member.

11. The turning device according to claim 1, wherein the stationary holding member comprises a stationary support shaft extending along the turning axis, one of the bearing members being attached to one end of the stationary support shaft.

12. The turning device according to claim 11, wherein the movable holding member is mounted so as to rotate on the support shaft.

13. The turning device according to claim 1, further comprising at least one rotating drive arm for a container received so as to be supported on the bearing members, the at least one rotating drive arm integrally attached to the movable holding member.

14. The turning device according to claim 1, wherein the turning device is capable of turning a nuclear fuel assembly container.

15. The turning device according to claim 1, wherein the turning device is capable of being operated under water.

16. A turning assembly comprising:
a nuclear fuel assembly container; and
the device according to claim 1.

17. A nuclear power generating plant comprising:
the turning assembly according to claim 16.

* * * * *